United States Patent
Geiger et al.

(10) Patent No.: US 9,429,952 B2
(45) Date of Patent: Aug. 30, 2016

(54) ROTORCRAFT CONTROL LAWS FOR SEA-BASED OPERATIONS

(71) Applicant: Sikorsky Aircraft Corporation, Stratford, CT (US)

(72) Inventors: Derek Geiger, Wilton, CT (US); James Rigsby, Fort Worth, TX (US); Aaron L. Greenfield, Shelton, CT (US); Vineet Sahasrabudhe, Cheshire, CT (US); Jennifer D. Goss, Lewisville, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/245,036

(22) Filed: Apr. 4, 2014

(65) Prior Publication Data

US 2015/0286220 A1    Oct. 8, 2015

(51) Int. Cl.
| G05D 1/00 | (2006.01) |
| G05D 1/06 | (2006.01) |
| B64C 27/00 | (2006.01) |
| G05B 13/04 | (2006.01) |

(52) U.S. Cl.
CPC ............ G05D 1/0676 (2013.01); B64C 27/00 (2013.01); G05B 13/04 (2013.01); G05D 1/00 (2013.01); G05D 1/0607 (2013.01); G05D 1/0684 (2013.01)

(58) Field of Classification Search
CPC .... G05D 1/00; G05D 1/0607; G05D 1/0676; B64C 27/00
USPC .......................................................... 701/3
See application file for complete search history.

(56) References Cited

U.S. PATENT DOCUMENTS

| 5,123,615 | A | * | 6/1992 | Wagner et al. | 244/116 |
| 5,687,930 | A | * | 11/1997 | Wagner et al. | 244/116 |
| 6,064,924 | A | * | 5/2000 | Fleischmann | 701/16 |
| 6,279,500 | B1 | * | 8/2001 | Allen et al. | 114/261 |
| 6,611,737 | B1 | | 8/2003 | El-Tahan et al. | |
| 8,392,037 | B2 | | 3/2013 | Sahasrabudhe et al. | |
| 8,457,813 | B2 | | 6/2013 | Hogstrom et al. | |
| 8,473,124 | B2 | * | 6/2013 | Shue et al. | 701/4 |
| 8,483,890 | B2 | * | 7/2013 | Dutton | 701/16 |

(Continued)

FOREIGN PATENT DOCUMENTS

| CN | 102393641 A | | 3/2012 |
| CN | 102854885 A | | 1/2013 |
| CN | 102411305 B | * | 3/2014 |

OTHER PUBLICATIONS

Hansén et al. "Autonomus Helicopter Landing on a Mobile Platform", KTH Engineering Sciences, Dec. 31, 2011, 71 pages, Royal Institute of Technology, Stockholm, Sweden, URL:http://www.diva-portal.org/smash/get/diva2:571430/FULLTEXT01.pdf, XP055224602.

(Continued)

Primary Examiner — Mussa A Shaawat
Assistant Examiner — Michael Berns
(74) Attorney, Agent, or Firm — Cantor Colburn LLP

(57) ABSTRACT

A method and system of controlling a rotorcraft for sea-based operations includes receiving sensed information indicative of an operation of the rotorcraft; receiving operator commands, ship models and system constraints; and determining a solution to an optimization function that avoids violating the system constraints, the solution being representative of control command signals for augmenting a flight response of the rotorcraft to a ship.

14 Claims, 2 Drawing Sheets

(56) References Cited

U.S. PATENT DOCUMENTS

| | | |
|---|---|---|
| 8,818,581 B2* | 8/2014 | Bourakov et al. .............. 701/16 |
| 2005/0033489 A1 | 2/2005 | Tezuka |
| 2010/0228408 A1* | 9/2010 | Ford et al. ...................... 701/16 |
| 2011/0118910 A1 | 5/2011 | Geoffroy et al. |
| 2011/0301723 A1* | 12/2011 | Pekar .................. G05B 13/048 700/29 |
| 2013/0009013 A1 | 1/2013 | Bourakov et al. |
| 2013/0206899 A1* | 8/2013 | Sahasrabudhe ...... G05D 1/0858 244/17.13 |
| 2014/0350754 A1* | 11/2014 | Elgersma et al. .............. 701/16 |

OTHER PUBLICATIONS

Extended European Search Report issued on Nov. 6, 2015 in corresponding EP Patent Application No. 15162173, 5 pages.

* cited by examiner

ROTORCRAFT CONTROL LAWS FOR SEA-BASED OPERATIONS

BACKGROUND

The subject matter disclosed herein relates generally to the field of rotorcraft and, in particular, to an advanced control law with a model predictive control that utilizes a fly-by-wire system for sea-based operations of a helicopter.

DESCRIPTION OF RELATED ART

Vehicles, such as rotary wing aircraft, typically employ a control system that receives operator commands and interfaces those commands to components of the aircraft. For example, existing rotary wing aircraft may employ a primary flight control system (PFCS) and an automatic flight control system (AFCS) that receive operator commands and control aircraft operation. These control systems also sense vehicle status to provide feedback and improve control of the rotary wing aircraft.

Rotorcraft operation in sea-based operations presents a multitude of challenges for rotorcraft. A flight deck is frequently within the wake of the ship superstructure, creating an intensely turbulent environment. Further, significant deck motion from high sea state conditions causes a rotorcraft landing or load placement target to move constantly with the ship heaving, pitching and rolling motion. Additionally, degraded visual environments (DVEs) are frequently encountered in sea-based operations, resulting in a high pilot workload, degraded handling qualities, and reduced operational efficiency. Advanced rotorcraft control laws for sea-based operations in order to mitigate these challenges would be well received in the art.

BRIEF SUMMARY

According to one aspect of the invention, a method for controlling a rotorcraft for sea-based operations includes receiving sensed information indicative of an operation of the rotorcraft; receiving operator commands, ship models and system constraints; and determining a solution to an optimization function that avoids violating the system constraints, the solution being representative of control command signals for augmenting a flight response of the rotorcraft to a ship.

In addition to one or more of the features described above, or as an alternative, further embodiments could include continuously updating the system constraints that optimize a cost function.

In addition to one or more of the features described above, or as an alternative, further embodiments could include mathematical terms for command tracking errors and control of an actuator that is associated with the aircraft.

In addition to one or more of the features described above, or as an alternative, further embodiments could include receiving at least one of angular rate, attitude response, and acceleration rate for the rotorcraft.

In addition to one or more of the features described above, or as an alternative, further embodiments could include determining at least one of a relative position and motion between the ship and the aircraft.

In addition to one or more of the features described above, or as an alternative, further embodiments could include receiving at least one of relative velocity limits between the ship and the rotorcraft, accuracy of a landing position on the ship, landing gear structural integrity, sink rate of the rotorcraft, and impact velocity of the rotorcraft on the ship.

In addition to one or more of the features described above, or as an alternative, further embodiments could include a ship airwake model and a ship motion model.

In addition to one or more of the features described above, or as an alternative, further embodiments could include a ship airwake model that comprises a model of an air flow field surrounding the ship.

In addition to one or more of the features described above, or as an alternative, further embodiments could include a ship motion model that comprises a model of a response of the ship advancing at constant forward speed.

According to another aspect of the invention, a system for controlling a rotorcraft during sea-based operations includes rotors, each rotor comprising a plurality of blades; a processor; and memory having instructions stored thereon that, when executed by the processor, cause the system to receive sensed information indicative of an operation of the rotorcraft; receive operator commands, ship models and system constraints; and determine a solution to an optimization function that avoids violating the system constraints, the solution being representative of control command signals for controlling the rotors of the rotorcraft approaching a ship. In addition to one or more of the features described above, or as an alternative, further embodiments could include continuously updating the system constraints that optimize a cost function.

In addition to one or more of the features described above, or as an alternative, further embodiments could include mathematical terms for command tracking errors and control of an actuator that is associated with the aircraft.

In addition to one or more of the features described above, or as an alternative, further embodiments could include receiving at least one of angular rate, attitude response, and acceleration rate for the rotorcraft.

In addition to one or more of the features described above, or as an alternative, further embodiments could include determining at least one of a relative position and motion between the ship and the aircraft.

In addition to one or more of the features described above, or as an alternative, further embodiments could include receiving at least one of relative velocity limits between the ship and the rotorcraft, accuracy of a landing position on the ship, landing gear structural integrity, sink rate of the rotorcraft, and impact velocity of the rotorcraft on the ship.

In addition to one or more of the features described above, or as an alternative, further embodiments could include a ship model such as a ship air wake model and a ship motion model.

In addition to one or more of the features described above, or as an alternative, further embodiments could include that the ship air wake model comprises a model of an air flow field surrounding the ship.

In addition to one or more of the features described above, or as an alternative, further embodiments could include that the ship motion model comprises a model of a response of the ship advancing at constant forward speed.

Other aspects, features, and techniques of the invention will become more apparent from the following description taken in conjunction with the drawings.

Technical effects of the invention includes reduces pilot workload and increases precision for shipboard landing, load placement, or other sea-based operations through a method for predicting or determining a point and time of contact with a ship deck and the relative velocity at the time of contact for a future period of time in order to shape the pilot's controller and displacement commands within operational constraints in order to produce a desired aircraft response.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
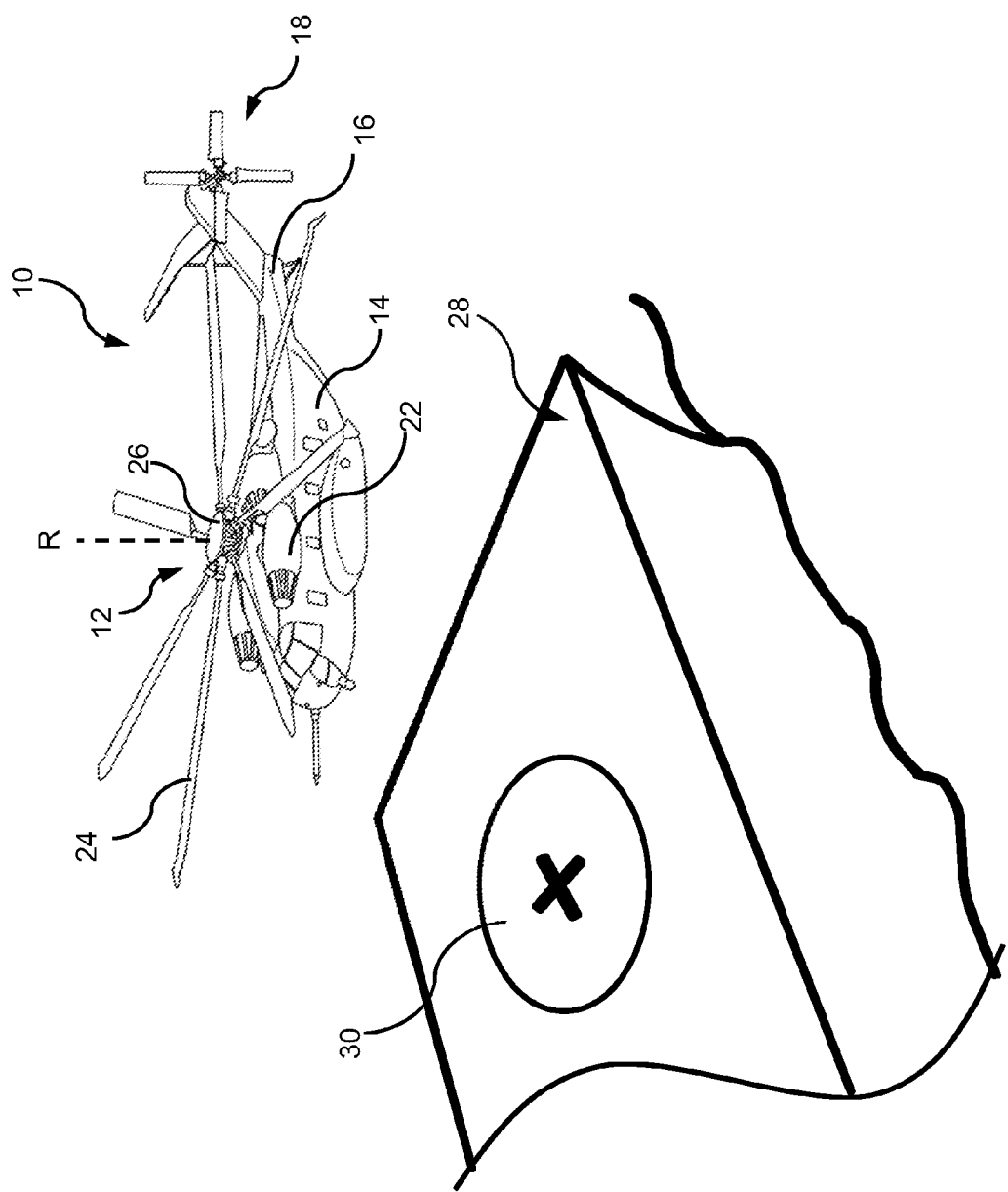
FIG. 1 illustrates an exemplary rotorcraft according to an embodiment of the invention.

FIG. 1 illustrates a rotary wing aircraft 10 which is moving into a position above a landing platform 30 on a ship 28 at sea according to an embodiment of the invention. The aircraft 10 has a main rotor assembly 12 which is driven about an axis of rotation R through a main gearbox by one or more engines 22. The main rotor assembly 12 includes a multiple of rotor blades 24 mounted to a rotor hub 26. The aircraft 10 also includes an airframe 14 having an extending tail 16 which mounts a tail rotor system 18, such as an anti-torque system, a translational thrust system, a pusher propeller, a rotor propulsion system and the like. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from embodiments of the invention.

Figure 2:
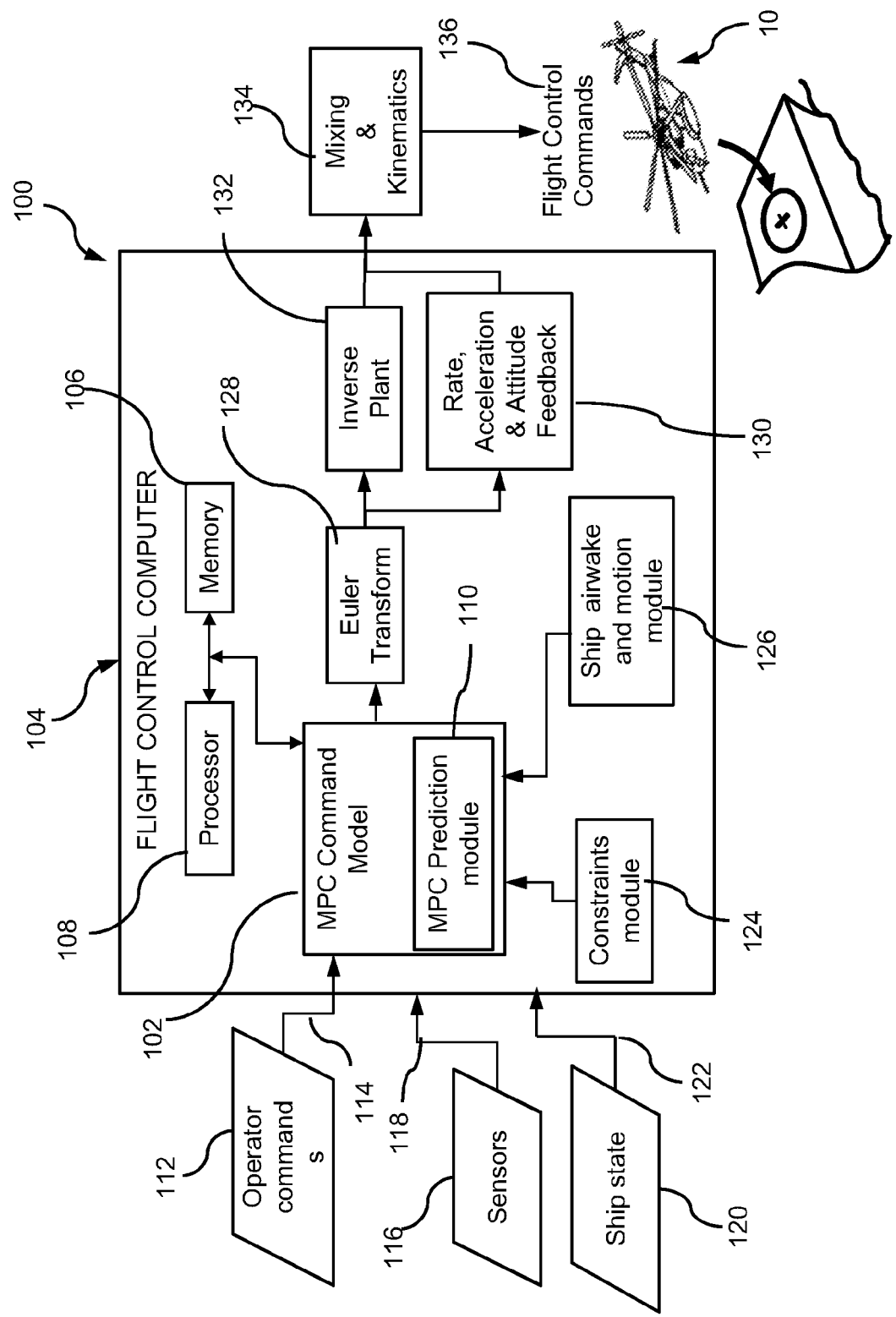
FIG. 2 depicts a control system in an exemplary embodiment.

FIG. 2 depicts an exemplary model predictive control (MPC) fly-by-wire control system 100 that uses a model following control system for sea-based operations according to an embodiment of the invention. Particularly, the control system 100 includes a command model 102 that implements a prediction algorithm for predicting or determining a point and time of contact with a ship deck and the relative velocity at the time of contact for a future period of time in order to shape the pilot's controller and displacement commands within operational constraints in order to produce a desired aircraft response for shipboard landing, load placement, or other sea-based operations. For ease of illustration and understanding, the functional block diagram illustrating the fly-by-wire control system 100 implements a MPC prediction algorithm within the command model 102 in order to predict aircraft response and determine an optimal solution for sea-based operations without exceeding system constraints. The shipboard landing control augmentations (including controlling the rotor assembly 12) are determined using the MPC prediction module 110 containing the prediction algorithm which reduces pilot workload while increasing the precision of the landing and avoiding aircraft constraints.

The prediction algorithm is implemented by a flight control computer 104 which includes a memory 106 and a processor 108. The memory 106 stores the prediction algorithm as executable instructions that are executed by the processor 108. The instructions may be stored or organized in any manner and at any level of abstraction, such as in connection with the execution of the prediction algorithm within prediction module 110. The processor 108 could be any processor (CPU), including a general purpose processor, a digital signal processor, a microcontroller, an application specific integrated circuit, a field programmable gate array, or the like. In embodiments, memory 106 may include random access memory (RAM), read only memory (ROM), or other electronic, optical, magnetic, or any other computer readable medium onto which is stored the prediction algorithm for implementation by the processor 108 as described below.

In order to execute the prediction algorithm, operator commands 112 are provided as signals to the computer 104 from a collective controller and a cyclic controller on line 114. Operator commands 112 include force output commands signals from a pilot, e.g. in a manned aircraft, which may include pilot inceptor inputs, and activation of various buttons and switches. Alternatively, operator commands 112 may come from another control system if the aircraft is unmanned. Operator commands 112 are translated within MPC command model 102 into predetermined objectives using finite-state logic and variable weightings (fixed and adaptive) based on operator commands, current flight conditions, and predetermined precedence criteria. Sensed parameters from aircraft sensors 116, on line 118, provide the flight control computer 104 with the aircraft's angular rate, attitude response, and acceleration rate. The MPC prediction module 110 also receives as signals on line 122, at least one of several ship states 120 such as, in some non-limiting examples, relative position and motion between the ship and the aircraft 10. Aircraft constraints from a constraint module 124 are passed to the command model 102 and ship airwave models, aircraft position relative to the ship, etc. are passed from a ship airwake and motion module 126 for implementation of the prediction algorithm within MPC prediction module 110.

Constraint module 124 stores aircraft constraints and provides these as inputs to the MPC prediction module 110. Aircraft constraints determine constraints of aircraft operation and can include, for example, relative velocity limits between the aircraft and the ship, accuracy of the aircraft landing position with respect to the landing platform 30, landing gear structural integrity, sink rate of the aircraft, impact velocity, or the like. The aircraft constraints are assembled as a set of primary, secondary, and global constraints at frequent intervals. The aircraft constraints are prioritized in order of importance. In the case of conflicting constraints, constraints are divided into hard and soft constraints. Hard constraints are critical constraints which cannot be relaxed; only soft constraints are relaxed. Within the category of soft constraints, each constraint is assigned a priority which determines the amount by which the soft constraint is relaxed relative to other constraints.

Ship and motion module 126 stores ship airwake and motion models and provides these to the MPC prediction module 110. The ship airwake and motion models include ship motion models and ship airwake models. Ship motion models include predictions of the response of the ship 28 advancing at constant forward speed with arbitrary heading in both regular and irregular seas. Ship motion time histories are also provided for a variety of sea states. The ship airwake models include methodologies to move the aircraft 10 around in various sea states. The ship airwake model can also store a time history of an airflow field surrounding the ship in addition to other parameters, e.g., aircraft position relative to the ship. In an embodiment, the ship motion model may be applied according to the method disclosed in a non-patent literature publication authored by T. C. Smith and W. G. Meyers entitled "SMP93-PC: Standard Ship Motion Program for Personal Computer with Small Boat Capability" (*Carderock Division, Naval Surface Warfare Center*, June 1994) which is herein incorporated by reference.

The MPC prediction module 110 receives operator commands 112, aircraft constraints from constraint module 124, sensed information from sensor 116, ship states 120, and information from ship and airwake motion module 126 to predict aircraft response. The command model 102 employs model-based feed forward and feedback control by utilizing the prediction algorithm within the MPC prediction module 110 to determine a solution to an optimization problem so that operator commands 102 are followed as closely as possible without violating the system constraints. The solution to the optimization problem uses MPC theory to optimize a cost function and recalculate the control augmentation to follow the pilot's commands while avoiding the constraints on landing accuracy and relative velocity impact limits by continuously updating the required control augmentation. The MPC prediction module 110 repeatedly propagates the prediction model forward to a future time period over a relatively short time horizon as it attempts to solve the optimization problem which is structured in terms of an objective function and constraints. The objective function includes mathematical terms for command tracking errors and actuator activity/control. The MPC prediction module 110 repeatedly solves the optimization problem in order to determine the control augmentations for the aircraft which minimize command tracking errors and minimizes actuator activity/control for the rotor assembly 12.

The optimal solution from the MPC prediction module 110 is sent as signals to the Euler transform module 128 for coordinate transformation. Coordinate transformation data from Euler transform module 128 is sent to the inverse plant module 132 to generate flight control command signals required for flight augmentation of the aircraft 10. This includes control commands to the rotor elements and other components (e.g., swashplate). Additionally, sensed parameter signals from sensors 116 are provided to the attitude module 130 to drive errors towards zero and produce the desired aircraft response. Signals from attitude module 130 and inverse plant module 132 are provided to a mixing module 134, which communicates commands for the displacement of servos and linkages on aircraft 10.

The MPC control system 100 for sea-based operations has an advantage over existing reactive control systems. The MPC control system combines the benefits of the reactive system with the predictive capability for the ship and aircraft. The control system integrates system constraints into the control algorithm as well as incorporating a prediction of the relative motion between the ship and the aircraft, which are used to determine an optimal solution to a constrained optimization problem. Based on a formulation of the cost function, the control system 100 calculates the control augmentation that meets the objective of precise landing within the constraints of impact velocity. This is a primary advantage over purely reactive architectures.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangements not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of controlling a rotorcraft for sea-based operations, comprising:
   receiving, with a processor, sensed information indicative of an operation of the rotorcraft;
   receiving, with the processor, operator commands, ship models and system constraints including relative velocity limits between the ship and the rotorcraft, accuracy of a landing position on the ship, landing gear structural integrity, sink rate of the rotorcraft, and impact velocity of the rotorcraft on the ship;
   determining, with a model predictive control (MPC) prediction module that employs a model based feedforward control utilizing a prediction algorithm, a solution to an optimization function that avoids violating the system constraints, the solution being representative of control command signals for augmenting a flight response of the rotorcraft to a ship;
   determining, with the processor, a solution to continuously update the system constraints that optimize a cost function utilizing MPC theory; and
   commanding the displacement of servos and linkages for controlling said rotorcraft.

2. The method of claim 1, wherein the optimization function includes mathematical terms for command tracking errors and control of an actuator that is associated with the rotorcraft.

3. The method of claim 1, wherein the receiving of the sensed information further comprises receiving at least one of angular rate, attitude response, and acceleration rate for the rotorcraft.

4. The method of claim 1, further comprising determining at least one of a relative position and motion between the ship and the rotorcraft.

5. The method of claim 1, wherein the ship models further comprises a ship airwake model and a ship motion model.

6. The method of claim 5, wherein the ship airwake model comprises a model of an air flow field surrounding the ship.

7. The method of claim 5, wherein the ship motion model comprises a model of a response of the ship advancing at constant forward speed.

8. A control system of a rotorcraft during sea-based operations, comprising:
   rotors, each rotor comprising a plurality of blades;
   a processor; and
   memory having instructions stored thereon that, when executed by the processor, cause the system to:
      receive, with the processor, sensed information indicative of an operation of the rotorcraft;
      receive, with the processor, operator commands, ship models and system constraints including relative velocity limits between the ship and the rotorcraft, accuracy of a landing position on the ship, landing gear structural integrity, sink rate of the rotorcraft, and impact velocity of the rotorcraft on the ship;
      determine, with a model predictive control (MPC) prediction module that employs a model based feedforward control utilizing a prediction algorithm, a solution to an optimization function that avoids violating the system constraints, the solution being representative of control command signals for controlling the rotors of the rotorcraft approaching a ship;

determine, with the processor, a solution to continuously update the system constraints that optimize a cost function utilizing MPC theory; and command the displacement of servos and linkages for controlling said rotorcraft.

9. The control system of claim 8, wherein the optimization function includes mathematical terms for command tracking errors and control of at least one actuator that is associated with the rotors.

10. The control system of claim 8, wherein the processor is configured to receive at least one of angular rate, attitude response, and acceleration rate for the rotorcraft.

11. The control system of claim 8, wherein the processor is configured to determine at least one of a relative position and motion between the ship and the rotorcraft.

12. The control system of claim 8, wherein the ship models further comprises a ship airwake model and a ship motion model.

13. The control system of claim 12, wherein the ship airwake model comprises a model of an air flow field surrounding the ship.

14. The control system of claim 12, wherein the ship motion model comprises a model of a response of the ship advancing at constant forward speed.

* * * * *